May 10, 1927.  1,627,745

J. MADDEN

LOCK NUT

Filed Oct. 30, 1924

Inventor
John Madden,
By
Attorney

Patented May 10, 1927.

1,627,745

UNITED STATES PATENT OFFICE.

JOHN MADDEN, OF DETROIT, MICHIGAN.

LOCK NUT.

Application filed October 30, 1924. Serial No. 746,767.

In the endeavor to find suitable means for the prevention of the loosening or loss of nuts upon or from bolts or threaded devices to which they are applied, a great many suggestions have been offered from time to time, some of which included auxiliary locking devices applied to the nuts for the purpose of resisting or preventing their reverse rotation after application to an article, but such devices according to their nature suffered from many disadvantages even in those cases where they very efficiently perform their locking function when once applied, among which disadvantages may be mentioned the following:

In some cases the locking of the nuts has been effected beyond the desired extent inasmuch as it prevented the removal or loosening of the nuts when it was desired to do so, where no provision was made to permit the locking devices being rendered inoperable or less effective when deliberate removal or loosening of the nuts was required. The provision of parts supplementary to the nuts was also objectionable due to the additional cost of such parts and the possibility of loss of the same or injury thereto which would destroy or minimize their usefulness and to the fact that they usually necessitated special provision of coacting means or devices on the nuts or on the parts adjacent the nuts when in position, which means were often in the form of notches, holes, projections or latches, adding to the expense of the device, limiting the positions in which the nuts might be locked, necessitating additional work on the nuts after their initially complete manufacture, or reducing the strength, usefulness, or convenience of the nuts due to the presence of such means.

Other methods of providing for a locking effect in nuts involved the distortion of the threads, limiting of the number thereof, the undue increasing of the dimensions of the nuts, the binding of the nuts upon the part to which they are applied in a manner tending to result in a destruction of the threads, and also often calling for special threads, thereby complicating the manufacture thereof.

By my invention I propose to provide a lock nut wherein the aforesaid disadvantages are obviated and wherein ease of operation and effectiveness of the locking feature are secured in a highly advantageous manner without loss of mechanical efficiency in the nut.

The invention further aims to provide a two-part lock nut having a virtually continuous thread extending therethrough, whereby full benefit of thread engagement is secured throughout the combined thickness of the said two-part lock nut; a further and important object being to provide a lock nut which may be locked on a threaded stem in any desired position irrespective of the provision of a juxtaposed bearing surface for said lock nut, whereby the said nut may be secured in engagement with a device from which the threaded stem extends or in spaced relation to such stem and whereby in the event of the said lock nut being for any reason moved from its original setting on a threaded stem it may, by its tendency to rotate thereon, automatically relock itself on the said stem and thereby prevent total disengagement or loss thereof from the said stem.

A still further object is to provide, in a two-part lock nut, for the application of forces resulting in both end and side thrust of the members thereof on the threaded member to which the lock nut is applied, whereby a double locking effort is attained, insuring a very efficient binding effect of the nut upon the threaded member which may be very readily brought into operation irrespective of the position of the nut on the said threaded member and which may be easily overcome by the deliberate manipulation of the parts of the nut, although not being liable to release except by such deliberate manipulation; a still further object being to provide a two-part lock nut wherein advantage is taken of the locking thrust effected by the tightening of one part against a superimposed part, as in the common practice of utilizing two ordinary nuts, together with the utilizing of an eccentric engagement between coacting eccentric faces of the said parts of the nut with consequent assistance in the securing of the parts of the said nut in their relative locking positions.

Still further objects subsidiary to or resulting from the aforesaid objects, or from the construction or operation of the said invention as it may be carried into effect, will become apparent as the said invention is hereinafter further disclosed.

In carrying the said invention into effect I may provide a lock nut which comprises two-parts coaxially and continuously tapped for the reception of a bolt or threaded member, one of the said members being provided with an eccentric cam entering and practically coincident with a corresponding recess in the opposed face of the other of said members and the threads of the said members being arranged in virtual continuity in one position of the members whereby upon the rotation of one of the said members with respect to the other the continuity of the said threads will be disturbed as well as the axial alinement thereof due to the eccentric engagement between the members of the nut, and whereby as a result when the said nut is engaged with a threaded member, such disturbances will result in end thrust between the members against the threads of the threaded member and in side thrust of the members respectively in opposite directions against said threaded member, which disturbances of thread, continuity and alinement, as well as the thrust referred to and the friction set up between the eccentrically engaging parts of the nut will result in an effective locking or binding of the said nut on the said threaded member, which may be overcome when desired by the rotation of one of the said members with respect to the other in a direction and to an extent necessary to reinstate the axial alinement of the members and the relief of the thrust resulting engagement of the eccentric parts of the said members.

All of which is more particularly described and ascertained hereinafter, by way of example, having reference to the accompanying drawings, wherein Figure 1 is a sectional view of a lock nut constructed in accordance with this invention and applied to a threaded member, the relative spacing of the threads and parts of the lock nut being exaggerated for clearness of illustration;

Similar characters of reference indicate similar parts in the several figures of the drawing.

Figure 1:
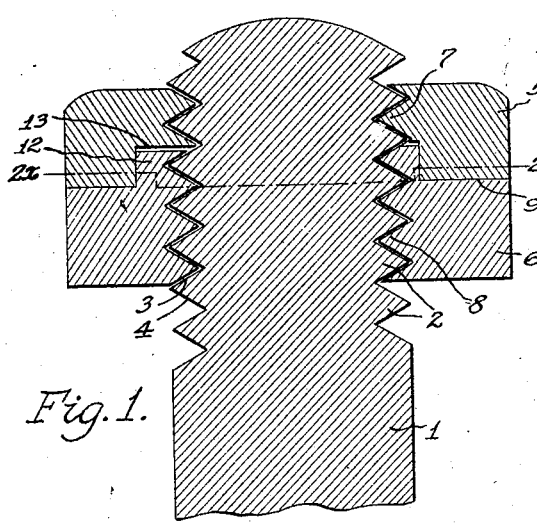
Figure 2:
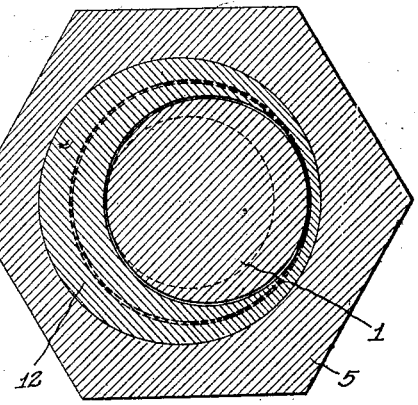
Figure 2 is a section of the same taken on the line $2^x$—$2^x$, Figure 1.

1 indicates a bolt, the threads 2 of which have their upper and lower faces indicated by the numerals 3 and 4 for purposes of particular designation in the following explanation of the matter and application of the lock nut, which comprises upper and lower members 5 and 6, respectively, which are coaxially tapped to form threads 7 and 8 in the two parts, the said threads extending virtually continuously through the said members 5 and 6 when they are assembled together in their normal or "free" position which will be further referred to and explained and which is not illustrated in Figure 1 of the drawing.

For convenience the members are externally of hexagonal or similar configuration, admitting of their being firmly gripped for rotation, and in the normal or free position indicated in Figure 1, the flats of the members are alined so that they present the appearance of a single nut split intermediate of its height, the parting being at 9; and to indicate the correct relationship of the two members, in which the said continuity of the thread exists, said members may be provided with index marks 10 and 11 adapted to be in alinement when the said members are in their free position, or in other words when the said members are in such relative positions that continuity of the threads 7 and 8 exists and the said members may be together freely rotated on the threads of the bolt.

The lower member 6 is shown as having extending upwardly therefrom and circumscribing the threaded bore thereof an eccentric cam 12 which freely enters a correspondingly eccentric recess 13 in the underside of the member 5 when the parts are in the free position as indicated in Figure 1, a sliding fit being provided between the periphery of the said cam and the surrounding wall of the recess 13. In this "free" position of the parts the alinement of the threads of the members permits their freely rotatable engagement with the bolt 1 and such rotation may be continued to any desired extent as long as the members are retained in their relative positions with respect to one another as would be the case were they both simultaneously gripped by a wrench when being applied to a bolt or threaded object; but if one of the members be rotated with respect to the other, then the continuity of the threads 7 and 8 would be disturbed so that if the rotation of the one member be in a direction effecting its movement towards the other member, then a binding of the two members upon the bolt or threaded object in the manner well known to mechanics will result, the threads of the members 5 and 6 being pressed respectively against the lower and upper surfaces 3 and 4 of the thread 2.

Figure 3:
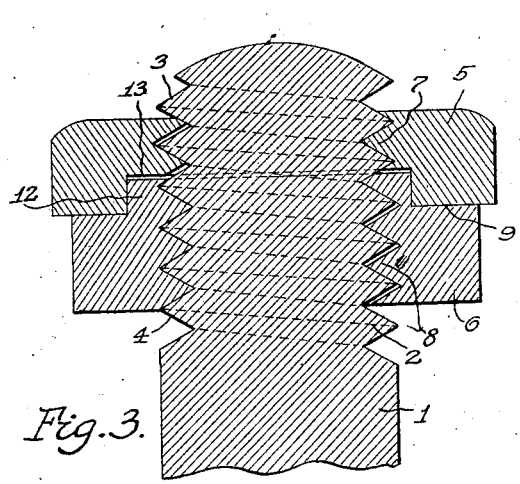
Figure 3 is a similar view to Figure 1, illustrating in an exaggerated manner the locking action of the said lock nut when the members thereof are rotated relative to one another for that purpose.

However, in the present case such rotation of one member with respect to the other is also accompanied by the rotation of the cam 12 within its recess and the consequent tendency of the said cam to ride within the walls of the said recess and to throw the members out of alinement. This action produces several results which are illustrated in an exaggerated way in Figure 3, which indicates the members of the lock nut as having been relatively rotated to the extent indicated in Figure 4, whereby the cam 12 riding against the surrounding wall of the recess 13 has resulted in a displacement of the upper member towards the left hand side of the figure and of the lower member towards the right hand side of the figure, as the result of which opposed lateral forces are set up in the two members, and a side thrust exerted in each case in an opposite direction by the said members against the bolt 1, this action being also combined with the end thrust referred to between the said members. The said action therefore produces a combination of stresses tending to force the threads of the members to assume a position on the thread of the bolt somewhat approximating that illustrated in an exaggerated form in Figure 3, which tendency very effectively binds the lock nut against movement of its bolt.

There is still another factor which enters into the effectiveness of the locking function and that is the frictional engagement which takes place between the periphery of the cam and the surrounding wall of the recess 13, which friction binds the members together with a force equal to that resulting in the side thrust of the members upon the bolt, so that there is little liability of the members returning to a free or unlocked position, the throw of the cam being small, although one or other of the said members may be deliberately rotated, such as by the application of a wrench thereto, in order to bring it into its normal position relative to the other of said members, when they may again both be freely rotated together on their bolt.

Figure 4:
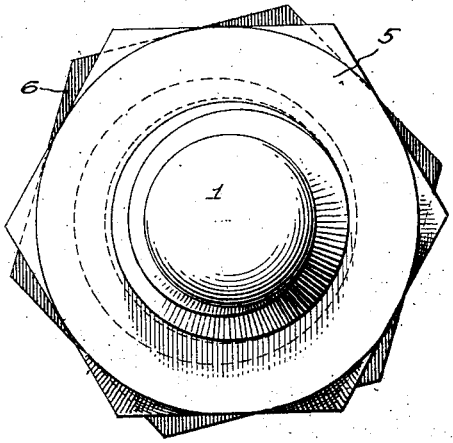
Figure 4 is an end elevation of the same.
Figure 5:
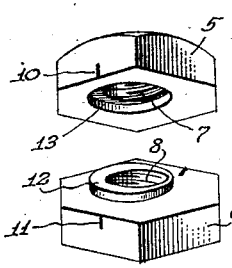
Figure 5 is a perspective detail view of one of the lock nut members.
Figure 6:
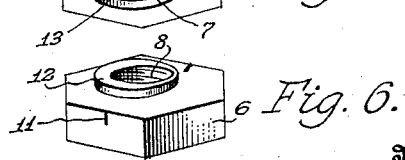
Figure 6 is a perspective detail view of the coacting member.

As will be understood from Fig. 4, the length of the relative angular movement of the two nuts in passing from free to locked position or vice versa, is approximately 15°. Obviously, the length of such movement on the threads of the bolt is of a similar angle. And since the amount of relative movement of the two nuts axially will depend upon the pitch of the threads, it will be readily understood that with an angular movement of one nut relative to the other is very small; in fact, the length of axial movement may be found almost within the limits of the slight play that is provided by the male and female threads of the bolt and nuts, so that in actual practice, the nuts are practically in facial contact when in their free-running position.

There are several positive advantages accrue by reason of this condition. For instance, when the nuts are to be run upon the bolt thread, there is no need for attempting to hold them at an accurately-spaced position, since they can be brought into the facial contact with the index marks alined, and both nuts will freely run on to the bolt threads; where initial spacing is required, it is difficult to provide or determine the actual space during the absence of the bolt threads, and the cam conditions prevent rotation of the outer nut to correct this condition. Another advantage results from the fact that with the facial contact present in the free-running position, relative movement of one nut angularly to the other provides relative movement of the contacting faces, with the thread pitch active to produce the small axial movement of the moving nut; hence, the contacting faces coact to provide pressures on the opposite nut, the result being that the thrust pressures will tend to force the inner nut inwardly and the outer nut outwardly onto the thread faces, thus setting up the conditions indicated in Fig. 3, and providing the thread tightening effect throughout the axial length of both nuts, the effect being on one face of the bolt thread in the zone of one of the nuts, and on the opposite face of the thread in the zone of the other nut.

The particular shape of the cam and of the surface with which it coacts its a matter of convenience or desirability, and may be varied to suit manufacturing or other conditions, although, the greater the bearing surface that can be secured, the greater the friction and consequent binding of the members against unlocking, so that an eccentric such as that illustrated is a preferred form, and the provision of this eccentric and its recess does not materially add to the cost of production of the lock nut, as compared to the ordinary plain dual nuts commonly employed, as they may be formed in the facing operation by simply providing for the eccentric chucking of the blanks from which the members are cut during the facing operation; and the securing of continuity in the threads of the members may be easily attained by proper setting of the taps or threading machines by which the threads are cut with that object in view.

The advantages resulting from the simple nature of the device and the fact that it is free from auxiliary mechanisms or attachments are mostly obvious and become increasingly evident when the first uses to which it may be put are considered, as it will be quite apparent that the device is applicable in any position and for any purpose where an ordinary nut may be employed.

With regard to the drawing, it is pointed out that the exaggerated nature thereof is simply intended for purposes of illustrating the tendency of the parts to assume certain positions and is not intended to indicate the actual positions assumed thereby, precise illustration of such positions not being feasible, as, where the parts are machined to close limits, the actual movement especially between the threads of the nut and bolt would be to all practical intents and purposes practically immeasurable.

This invention may be developed within the scope of the following claims without departing from the essential features of the said invention, and it is desired that the specification and drawing be read as merely illustrative and not in a limiting sense, except as necessitated by the prior art.

What I claim as my invention is:

1. A lock nut comprising a pair of threaded members, one member having an eccentric recess around the bore thereof, a cam carried by the other member and adapted to fit into said recess, said cam being also threaded internally in continuation of the threads in the member by which it is carried, said members being so threaded that their threads are mutually continuous when the cam is entered to its normal limit in said recess.

2. A lock nut comprising a pair of threaded members, one member having an eccentric recess around the bore thereof, a cam carried by the other member and adapted to fit into said recess, said cam being also threaded internally in continuation of the threads in the member by which it is carried, said members being so threaded that their threads are mutually continuous when the cam is entered to its normal limit in said recess, said cam being slightly less in thickness than the recess whereby one of said member may be turned to break the continuity of the threads and to create pressure between the cam and the wall of said recess.

In testimony whereof I affix my signature.

JOHN MADDEN.